United States Patent [19]

Manor

[11] Patent Number: 5,457,623

[45] Date of Patent: Oct. 10, 1995

[54] HIGH EFFICIENCY POWER CONVERTER HAVING DIODE-CONTROLLED SWITCHING FREQUENCY FOR ILLUMINATION LOADS

[75] Inventor: Dror Manor, Herzliya, Israel

[73] Assignee: Shafrir Romano, Rishon LeTzion, Israel

[21] Appl. No.: 86,117

[22] Filed: Jul. 6, 1993

[51] Int. Cl.[6] .................................................. H02M 5/42
[52] U.S. Cl. .............................. 363/98; 363/16; 363/55; 323/231
[58] Field of Search .................................. 363/16, 17, 55, 363/95, 97, 98, 131, 132; 323/231; 315/DIG. 7

[56] References Cited

U.S. PATENT DOCUMENTS

| | | | |
|---|---|---|---|
| 5,014,182 | 5/1991 | Cohen | 363/132 |
| 5,111,118 | 5/1992 | Fellow et al. | 315/307 |
| 5,229,929 | 7/1993 | Shimizu et al. | 363/98 |

Primary Examiner—A. D. Pellinen
Assistant Examiner—Y. Jessica Han
Attorney, Agent, or Firm—Edward Langer

[57] ABSTRACT

A high power, high efficiency power converter for illumination loads, with low heat dissipation. In the preferred embodiment, the converter utilizes a switching means pair providing a high frequency inverter, provided by a pair of FETs, each arranged in one of a pair of gate driver loops connected to the auxiliary windings of a transformer whose primary winding samples the current through an illumination load. The periodic turn-off and turn-on operation of each of the FET switches is defined as the switching frequency, which is dependent on a Zener diode connected across the FET gate in each of the respective driver loops. The Zener breakdown voltage determines the winding voltage and transformer saturation point, at which time one FET switches off, and the other turns on. Use of FETs as the switching device provides several advantages, including a quicker switching time and reduced switching losses and power dissipation. This allows use of smaller transformers suited to higher switching frequencies, and this in turn enables miniaturization of the power converter, which provides an advantage in indoor illumination applications. A feature of the invention is the provision of an overload protection circuit which interrupts the switching unit function and stops the power converter operation.

10 Claims, 3 Drawing Sheets

HIGH EFFICIENCY POWER CONVERTER HAVING DIODE-CONTROLLED SWITCHING FREQUENCY FOR ILLUMINATION LOADS

FIELD OF THE INVENTION

The present invention relates to AC power converters generally, and more specifically, to an AC power converter with high power, high efficiency output for illumination loads.

BACKGROUND OF THE INVENTION

The prior art contains many variations of solid-state power conversion circuits which contain oscillators and switching units based on use of field effect transistors (FETs). For example, U.S. Pat. No. 4,669,038 to Whitford discloses a low power high efficiency power supply using an FET as a chopper. An FET commutated current-fed inverter using thyristors is disclosed in U.S. Pat. No. 4,415,963 to Edwards et al. An FET switching regulator is disclosed in U.S. Pat. No. 4,792,746 to Josephson et al.

A constant current supply is disclosed in U.S. Pat. No. 4,808,909 to Eddlemon, using FETs as a current source, and Zener diodes for bias voltage stabilization. A DC to DC power converter using an energy transfer FET switch is disclosed in U.S. Pat. No. 4,868,730 to Ward. Another DC to DC power converter uses an FET with PWM control to provide voltage regulation, as disclosed in U.S. Pat. No. 5,109,186 to Lieu Fan-Yi.

A power FET having a bipolar transistor acting as an inrush current limiting shunt is disclosed in U.S. Pat. No. 5,010,293 to Ellersick. An FET protection circuit using a Zener diode arrangement for turning on the FET for a load dump is disclosed in U.S. Pat. No. 5,119,265 to Pigott et al. A high voltage power converter using FETs is disclosed in U.S. Pat. No. 4,872,100 to Diaz. A battery power supply circuit for a video light using an FET for power control is described in U.S. Pat. Nos. 5,012,392 and 4,959,755 to Hochstein.

There are known AC power converters for use with indoor illumination loads in the range of 200–400 watts, and these typically use high frequency oscillators having bipolar transistors for high frequency switching. In a 200 watt converter, for example, the bipolar switching transistors used in the oscillator typically switch load current of 4 amperes, and require maintenance of a relatively high base current of 500 mA. For larger loads, such as 400 watts, the transistor needs to carry even greater load current and requires a non-linear increase in base current, to maintain the switching characteristics which drive the transistor into saturation. Larger transistors must be used, and as a result, the transistor driver transformer must be larger and heavier, and this results in increased heat dissipation through increased power consumption and switching losses In both the transistor and transformer.

For indoor illumination loads, the use of larger and heavier components to meet a particular load requirement translates into a larger physical size of the light fixture, and this is undesirable as it complicates mounting arrangements, etc.

Therefore, it would be desirable to provide a high efficiency, high power converter for indoor lighting loads which is relatively small in size and features reduced heat dissipation.

SUMMARY OF THE INVENTION

Accordingly, it is a principal object of the present invention to overcome the above-mentioned disadvantages of prior art power converters and provide a high power, high efficiency power converter for illumination loads, with low heat dissipation.

In accordance with a preferred :embodiment of the present invention, there is provided a high efficiency power converter for illumination loads comprising:

a) rectifier means for converting an input AC voltage to DC voltage;

b) pair of switching means connected to an output polarity of said rectifier means, for converting said DC voltage to a high frequency switched AC voltage with a predetermined frequency, said switching means providing a load current to the illumination load;

c) voltage driver transformer means having a primary winding connected between said pair of switching means for sampling said load current and developing a driving voltage on an auxiliary winding of said voltage driver transformer means; and d) control means for controlling periodic operation of said pair of switching means at said predetermined frequency, said control means comprising a Zener diode to which said driving voltage is applied via said auxiliary winding, said Zener diode having a breakdown voltage substantially equivalent to said driving voltage, such that said Zener breakdown voltage establishes said predetermined frequency.

In the preferred embodiment, the switching means pair comprises a pair of FETs, each arranged in one of a pair of gate driver loops connected to the auxiliary windings of a transformer whose primary winding samples the current through an illumination load. The periodic turn-off and turn-on operation of each of the FET switches is defined as the switching frequency, which is dependent on a Zener diode connected across the FET gate in each of the respective driver loops. The Zener breakdown voltage determines the winding voltage and transformer saturation point, at which time one FET switches off, and the other turns on.

Use of FETs as the switching device provides several advantages, including a quicker switching time and reduced switching losses and power dissipation. This allows use of smaller transformers suited to higher switching frequencies, and this in turn enables miniaturization of the power converter, which provides an advantage in indoor illumination applications.

A feature of the invention is the provision of an overload protection circuit which interrupts the switching unit function and stops the power converter operation.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements and sections throughout, and in which.

DETAILED DESCRIPTION OF A PREFERRED EMBODIMENT

Figure 1:
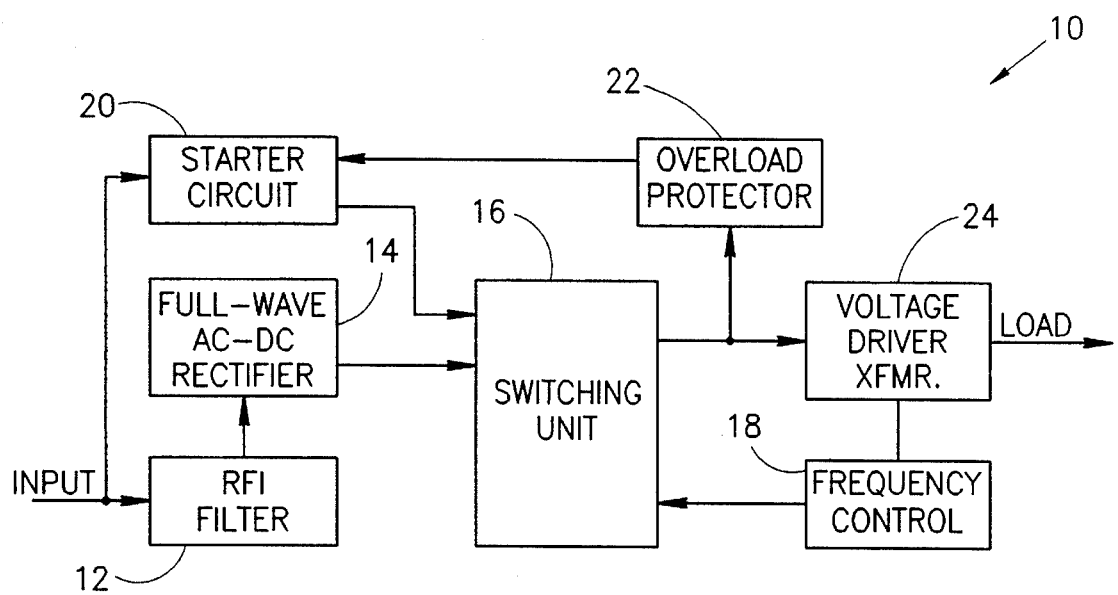
FIG. 1 is a block diagram of a preferred embodiment of a high efficiency power converter for illumination loads.

Referring now to FIG. 1, there is shown a block diagram of a preferred embodiment of a high efficiency power converter 10 for illumination loads, constructed and operated in accordance with the principles of the present invention. Power converter 10 comprises a front-end radio frequency filter 12 which is fed by an input voltage, typically 110v 60Hz. The input voltage is rectified by rectifier 14, to provide a DC output voltage which is fed to a switching unit 16, which is a high frequency inverter.

The output of switching unit 16 is a square-wave type voltage controlled by a controller 18, which is triggered by a starter circuit 20. Operation of the starter circuit is inhibited by an overload protector 22, when a current overload condition is detected. The output is fed to the illumination load via a load transformer (not shown), by a voltage driver transformer T2 (24).

In accordance with the principles of the present invention, the output voltage provided by switching unit 16 is dependent on the switching operation of a pair of FETs, providing an oscillator. The oscillation frequency is determined by a driver circuit (controller 18) controlling the FET switch turn-on and turn-off times.

Referring now to FIGS. 2A–D, there is shown an electronic schematic diagram of a preferred embodiment of power converter 10. Transformer T1 (FIG. 2C—Phillips type RCC14/9/9 4330-030-3766) is connected in a common-mode noise rejection arrangment with capacitors C2–C3, providing an RF interference filter. A full wave bridge rectifier 14 converts the AC input votage and provides a DC input to switching unit 16.

Figure 2C:
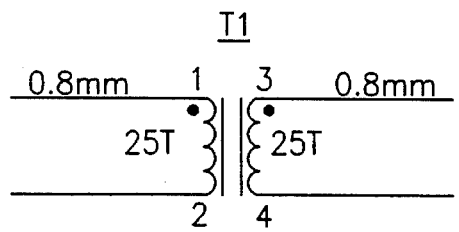
FIGS. 2A–D are electronic schematic diagrams of preferred embodiment of the power converter of FIG. 1.
Figure 2D:
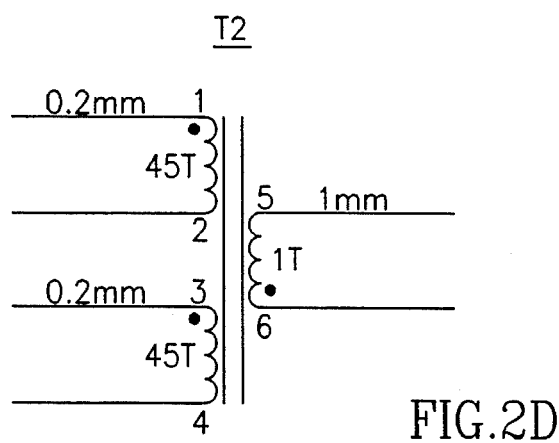
Figure 2A:
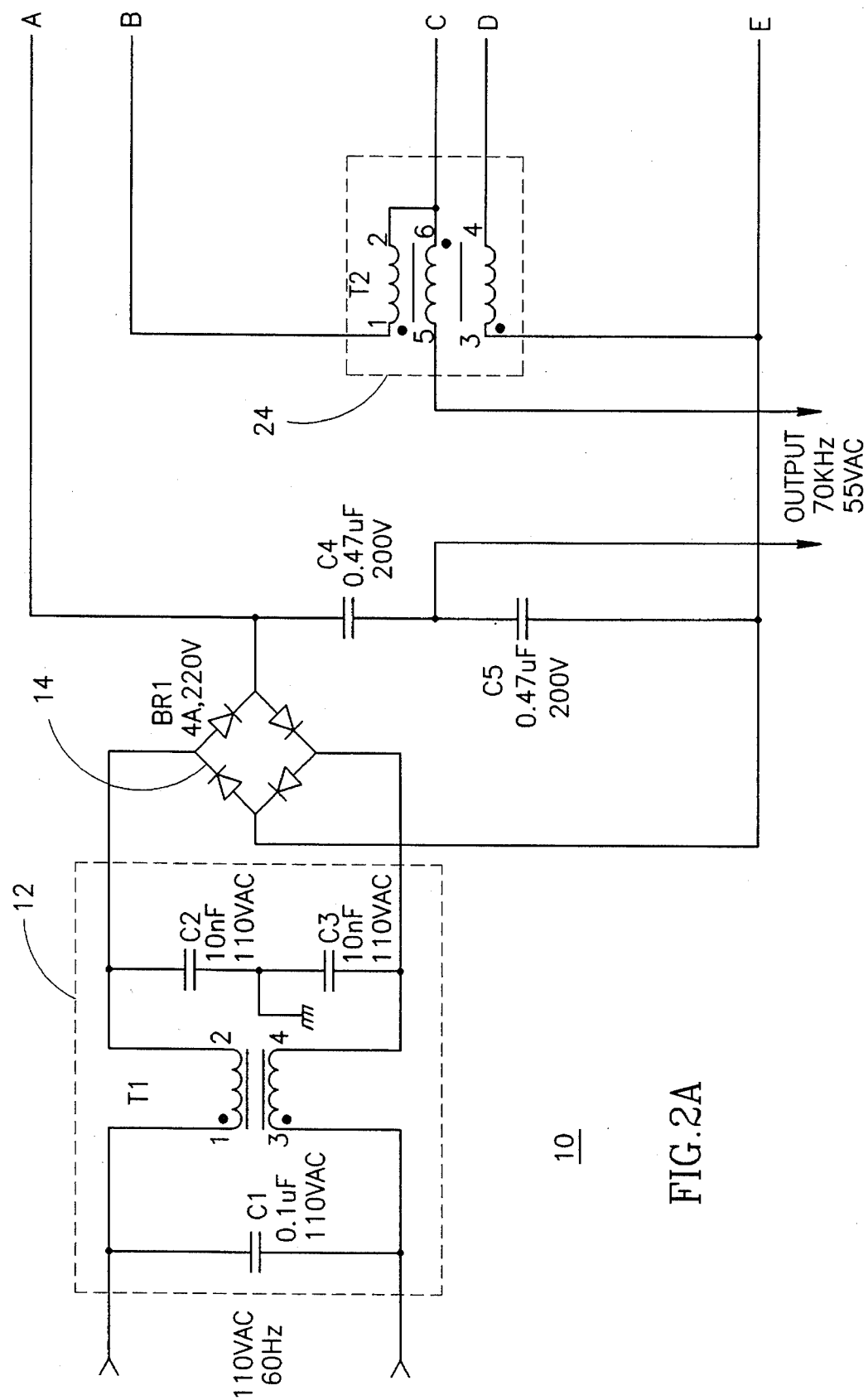
Figure 2B:
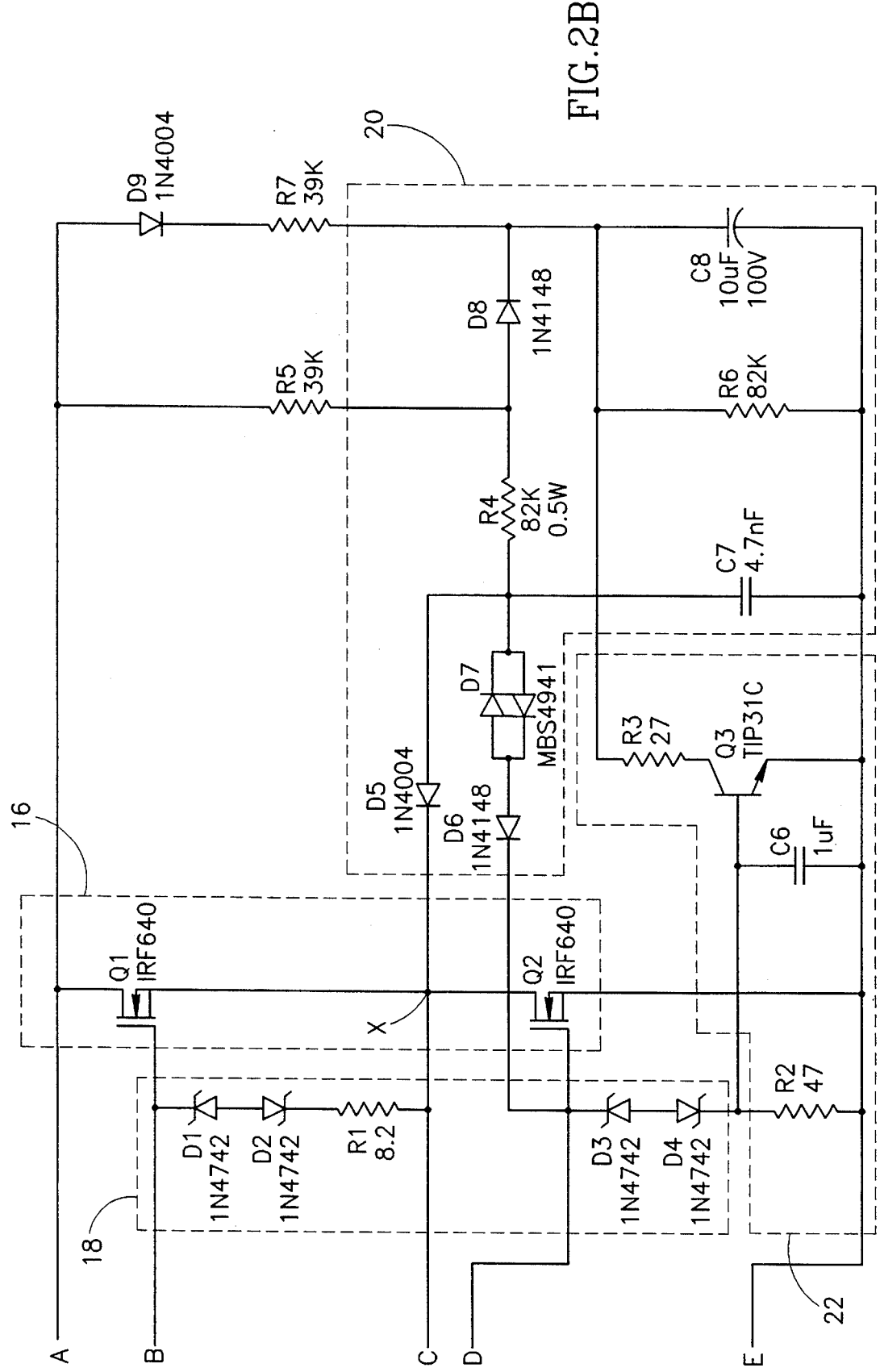

Switching unit 16 is fed via a pair of input capacitors C4–C5 arranged as a voltage divider across the output of rectifier 14. These capacitors are chosen as low values to protect against instantantaneous short circuits, as described further herein. The converter 10 output voltage is fed to the load (not shown) from a point between capacitors C4–C5 and from a connection to the primary winding (5–6) of transformer T2 (FIG. 2D—Phillips type RCC9/6/3 4330-030-3709). The other T2 primary winding connection is made to a point "X" between a pair of FET switches Q1 and Q2 which are connected in series, source-to-drain across the output of rectifier 14.

The transformer T2 (24) has two auxiliary windings (1–2 and 3–4), each of which is used in a gate driver loop for a respective one of each of FETs Q1 and Q2. The gate driver loop is formed by one end of each auxiliary winding, with the other end of each auxiliary winding connected to the source of its respective FET switch. Each loop is connected such that the winding polarity of its gate connection is opposite that of the other gate. In each FET gate driver loop, a gate-to-source shunt connection is provided by a pair of back-to-back Zener diodes, respectively, D1–D2 and D3–D4, each with a series resistor (R1–R2).

A starter circuit 20 for initiating the oscillatory operation of switching unit 16 comprises a bidirectional diode thyristor, also known as a DIAC (D7), and a charging network for charging capacitor C7 formed by resistors R5, R4. The network formed by transistor Q3, resistors R2 and R3, provides overload protection via capacitor C8 and diode D8 of starter circuit 20, as described further herein.

The operation of power converter 10 is now described. On power-up, FETs Q1 and Q2 are shut off, and one of them must be turned on to initiate the gate driver loop currents. The starter circuit 20 uses rectifier 14 voltage to develop charging current in the charging network through R5 and R4, and C7 applies the voltage developed to D7. When a certain voltage level is reached, D7 breaks down and becomes a short circuit, applying a voltage to the gate of FET Q2, turning it on. When turned-on, FET Q2 completes a circuit path and current flows from the rectifier negative output through capacitor C5, the output load connections, and through the transformer T2 primary winding (5–6).

The current passing through windings 5–6 of transformer T2 develops a voltage on each of the auxiliary windings 1–2 and 3–4. With current flow through winding 5–6 in one direction, the voltage outputs on connection points 1 and 4 will be opposite polarity, and positive voltages are applied at point 4 to the back-to-back Zener diodes D3–D4, and at point 2 to the back-to-back Zener diodes D2–D1. Since the voltage output on the auxiliary windings at points 4 and 2 are greater, respectively, than the breakdown voltages of respective Zener diodes D3 and D2, loop currents are generated.

In the loop comprising Zener diodes D3–D4, diode D3 conducts at the breakdown voltage and diode D4 operates as a normal diode since it Is forward-biased. Thus, the circuit path is completed and current flows through T2 auxiliary winding 3–4.

In the loop comprising Zener diodes D1–D2, diode D2 conducts at the breakdown voltage and diode D1 operates as a normal diode since it is forward-biased. Thus, the circuit path is completed and current flows through T2 auxiliary winding 1–2.

The current flow in windings 5–6 is determined by the output load transformer (not shown), but in addition there is a magnetizing current component which builds up over time until transformer T2 reaches the saturation point. At that point the following occurs: auxiliary windings 1–2 and 3–4 will no longer have an induced output voltage, and therefore the FET to which each is respectively connected is turned off, causing cessation of current flow in the primary winding 5–6.

As the current flow in winding 5–6 ceases, a reverse output voltage is induced in the auxiliary windings 1–2 and 3–4. The auxiliary winding voltage reversal turns on the FET that was previously turned off, and shuts off the FET that was turned on.

As a result, current flow now begins in primary winding 5–6 in the opposite direction. Simultaneously, magnetizing current builds up and drives transformer T2 into saturation with the reverse flux polarity.

The switching unit 16 oscillation operation continues in the same fashion, and thus, a high frequency AC voltage output is provided to the illumination load. In accordance with the principles of the present invention, through application of skill of the art electronic design techniques, an output voltage with a frequency of between 50–200 KHz can be provided. In this way, the size of the output load transformer can be substantially reduced, enabling miniaturization of the power converter 10.

It is a particular feature of the present invention that the Zener diodes in the gate driver loops determine the voltage developed by windings 1–2 and 3–4, and this in turn determines the amount of time required to reach transformer T2 saturation, since these voltages affect the magnitude of the transformer magnetizing current. Thus, the voltage on windings 1–2 and 3–4 is set by the predetermined Zener diode breakdown voltage, and by appropriate diode selection, the switching unit 16 frequency is determined.

The use of a FET in switching unit 16 provides several advantages:
1) Primarily, the switching time is lower on a FET then on a bipolar transistor in terms of turn off/turn on.
2) The quickness in the switching time also reduces losses because the I-V power dissipation product is reduced due to a reduced switching time from a turn-on to a turn-off condition.
3) The FET is a voltage driven device, and is not as concerned with the current flow through it in relation to its switching function of turn-on/turn-off. The gate voltage is what controls the turn on/turn off mode, and thus the FET is unlike a bipolar transistor, where, because of the amplification factor, the base current level is an important part of determining the operation in the switched-on or off mode. With a FET, only the gate voltage determines switching.

Another way of describing this is that if a bipolar transistor were used to determine the voltage developed across the transformer T2 auxiliary windings, a higher current would be needed to establish the bipolar transistor voltage drop. By use of a FET, the requirement of a high current is eliminated, and a Zener diode is used to develop the voltage drop. The switching function and the device voltage drop, instead of being provided by one device such as a bipolar transistor, are provided by two different devices; 1) a pure switch (FET), and 2) a Zener diode. The known breakdown voltage of the Zener diode can be chosen in relation to the saturation time of the transformer T2, to determine the oscillation frequency of the circuit.

At the end of each half cycle, the output of bridge rectifier 14 is zero, and point "X" has zero voltage. Thus, diode D5 discharges the charge on capacitor C7, and to restart the operation, starter circuit 20 must recharge capacitor C7 to apply another gate voltage switching signal to FET Q2 from capacitor C7 via DIAC D7 to switch it to turn-on mode.

An additional feature of the power converter 10 design is the provision of an overload protector 22 against a short circuit via the output load transformer. If this occurs, the loop current through D3–D4 would be too high, at which point transistor Q3 turns on, discharging capacitor C8. Diode D8 will divert charging current from capacitor C7, not allowing it to recharge, instead charging capacitor C8. The repeated starting function of starter circuit 20 will be interrupted, and at the half wave zero point of rectifier 14, circuit operation ceases.

Once capacitor C8 is discharged, it requires a certain amount of time to recharge, and only when capacitor C8 is recharged can capacitor C7 begin to charge. When the voltage on capacitor C7 exceeds the breakdown voltage of DIAC D7, starter circuit 20 will re-operate to turn on the FET, and if no overload condition exists, the operation will continue as normal.

For instantaneous short circuit conditions, the operation is not affected since each of capacitors C4 and C5 discharges instantaneously in each half-cycle. Because CdV/dT represents the current flow through the capacitor, choice of a low value capacitance limits the short circuit current, and if this condition remains, the overload protector 22 operates to interrupt the starter circuit 20 function, as described above.

Thus, power converter 10 has two forms of short circuit protection, the first using transistor Q3 which effectively is a slow acting short circuit protector which is effective in the case of an overload condition which remains for a few cycles. The second form of short circuit protection is against an instantaneous short circuit, by use of low value capacitors C4 and C5, to limit short circuit current flow.

Having described the invention with regard to certain specific embodiments, it is to be understood that the description is not meant as a limitation since further modifications may now suggest themselves to those skilled in the art and it is intended to cover such modifications as fall within the scope of the appended claims.

I claim:

1. A high efficiency power converter having a diode-controlled switching frequency for an illumination load comprising:

a) rectifier means for converting an input AC voltage to DC voltage;

b) pair of switching means connected to an output polarity of said rectifier means, for converting said DC voltage to a high frequency switched AC voltage with a predetermined diode-controlled switching frequency, said switching means providing a load current to the illumination load;

c) voltage driver transformer means comprising a saturable transformer having a primary winding connected between said pair of switching means for sampling said load current and developing a driving voltage on an auxiliary winding of said voltage driver transformer means; and d) control means for controlling periodic operation of said pair of switching means in response to said driving voltage at said predetermined frequency, said control means comprising a Zener diode to which said driving voltage is applied via said auxiliary winding, said Zener diode having a breakdown voltage substantially equivalent to said driving voltage, such that said Zener breakdown voltage establishes said predetermined frequency.

2. The converter of claim 1 wherein said pair of switching means comprises a pair of first and second FETs connected in series source-to-drain across said rectifier means, a point between said series-connected FETs being connected to one terminal of said transformer output winding, the other terminal thereof being connected to said load;

said voltage driver transformer means comprises a pair of first and second auxiliary windings, a gate of each of said pair of FETs being connected respectively to a terminal of one of said first and second auxiliary windings, the other auxiliary winding terminal being connected to said respective FET source; and said control means comprises a pair of series-connected back-to-back Zener diodes being connected in shunt connection between each said FET gate and said FET source, said first and second auxiliary windings each applying to a respective one of said FET gates a switching voltage with a polarity for turning on said FET while turning the other FET gate off, to allow current flow in said transformer primary winding until a saturation condition is reached, said switching voltage being determined by said Zener breakdown voltage and itself determining when said saturation condition occurs, whereupon said second auxiliary winding switching voltage reverses said polarity and turns on the other FET of said pair, said switching voltage polarity reversal determining said predetermined frequency.

3. The converter of claim 1 wherein said predetermined frequency is in the range of approximately 50–200 KHz, and the illumination load is connected to said switching means via an output load transformer reduced in size to enable miniaturization.

4. The converter of claim 1 further comprising an overload protection circuit comprising means for sampling a current developed by said driving voltage, and interrupting said switching means operation if said current exceeds a predetermined limit.

5. A method of providing high efficiency power conversion for illumination loads at a diode-controlled switching frequency, said method comprising the steps of:

a) rectifying an input AC voltage to DC voltage;
   b) converting said DC voltage to a high frequency switched AC voltage with a predetermined diode-controlled switching frequency by repetitively switching polarities of said DC voltage;
   c) supplying said switched AC voltage to an illumination load to generate a load current therein;
   d) sampling said load current and developing a driving voltage; and
   e) controlling said repetitive switching in said converting step in response to said driving voltage at said predetermined frequency by applying said driving voltage to a Zener diode having a breakdown voltage substantially equivalent to said driving voltage, such that said Zener breakdown voltage establishes said predetermined frequency.

6. The method of claim 5 wherein said DC to switched AC voltage converting step is performed by a FET transistor pair.

7. The method of claim 6 wherein said sampling step is performed by a primary winding of a voltage driver transformer, said voltage driver transformer having first and second auxiliary windings, a gate of each of said pair of FETs being connected respectively to a terminal of one of said first and second auxiliary windings, the other auxiliary winding terminal being connected to said respective FET source, and said controlling step is performed by a pair of series-connected back-to-back Zener diodes being connected in shunt connection between each said FET gate and said FET source, said first and second auxiliary windings each applying to a respective one of said FET gates a driving voltage with a polarity for turning on said FET while turning the other FET gate off, to allow current flow in said transformer primary winding until a saturation condition is reached, said driving voltage being determined by said Zener breakdown voltage and itself determining when said saturation condition occurs, whereupon said second auxiliary winding driving voltage reverses said polarity and turns on the other FET of said pair, said driving voltage reversal determining said predetermined frequency.

8. The method of claim 5 wherein said predetermined frequency is in the range of approximately 50–200 KHz, and the illumination load is supplied with said load current via an output load transformer reduced in size to enable miniaturization.

9. The method of claim 5 further comprising the step of sampling said load current flow and interrupting said converting step if said load current flow exceeds a predetermined limit.

10. A high efficiency power converter having a diode-controlled switching frequency for an illumination load comprising:

a) rectifier means for converting an input AC voltage to DC voltage;
   b) pair of switching means connected to an output polarity of said rectifier means, for converting said DC voltage to a high frequency switched AC voltage with a predetermined diode-controlled switching frequency, said switching means providing a load current to the illumination load, wherein said switching means comprises a pair of first and second FETs connected in series source-to-drain across said rectifier means;
   c) voltage driver transformer means comprising a saturable transformer having a primary winding one terminal of which is connected to a point between said series-connected FETs, the other terminal thereof being connected to said load, a gate of each of said pair of FETs being connected respectively to a terminal of one of a pair of first and second auxiliary windings, the other auxiliary winding terminal being connected to said respective FET source, said voltage driver transformer means sampling said load current and developing a driving voltage on each of said first and second auxiliary windings thereof; and
   d) control means for controlling periodic operation of said pair of switching means in response to said driving voltage at said predetermined frequency, said control means comprising a pair of series-connected back-to-back Zener diodes being connected in shunt connection between each said FET gate and said FET source, said first and second auxiliary windings each applying to a respective one of said FET gates said driving voltage with a polarity for turning on said FET while turning the other FET gate off, to allow current flow in said transformer primary winding until a saturation condition is reached, said driving voltage being substantially equivalent to said Zener breakdown voltage and itself determining when said saturation condition occurs, whereupon said second auxiliary winding driving voltage reverses said polarity and turns on the other FET of said pair, said driving voltage polarity reversal determining said predetermined frequency.

* * * * *